United States Patent
Schlack

(10) Patent No.: US 8,484,354 B2
(45) Date of Patent: Jul. 9, 2013

(54) DISTRIBUTED RESOURCE MANAGEMENT

(75) Inventor: John Schlack, Quakertown, PA (US)

(73) Assignee: Beaumaris Networks, Inc., Boxborough, MS (US)

( * ) Notice: Subject to any disclaimer, the term of this patent is extended or adjusted under 35 U.S.C. 154(b) by 176 days.

(21) Appl. No.: 12/913,260

(22) Filed: Oct. 27, 2010

(65) Prior Publication Data

US 2011/0106950 A1    May 5, 2011

Related U.S. Application Data

(60) Provisional application No. 61/257,251, filed on Nov. 2, 2009.

(51) Int. Cl.
*G06F 15/173* (2006.01)

(52) U.S. Cl.
USPC .......................... 709/226; 709/224; 709/225

(58) Field of Classification Search
USPC .......................................... 709/224, 225, 226
See application file for complete search history.

(56) References Cited

U.S. PATENT DOCUMENTS

| | | |
|---|---|---|
| 2008/0201748 A1 | 8/2008 | Hasek et al. |
| 2008/0235746 A1 | 9/2008 | Peters et al. |
| 2009/0106425 A1 | 4/2009 | Zuckerman et al. |
| 2011/0029981 A1* | 2/2011 | Jaisinghani .................. 718/104 |

OTHER PUBLICATIONS

Frank Dabek (A Distributed Hash Table, Massachusetts Institute of Technology, Sep. 2005).*
International Search Report mailed Dec. 30, 2010 in corresponding International Application No. PCT/US2010/54965.
PCT May 8, 2012 International Preliminary Report on Patentability and Written Opinion from International Application No. PCT/US2010/54954; 6 pages.

* cited by examiner

*Primary Examiner* — Yves Dalencourt
(74) *Attorney, Agent, or Firm* — Patent Capital Group

(57) ABSTRACT

A distributed resource management mechanism allocates transmission resources by distributing the resources among a plurality of service nodes each responsible for a portion of the resources according to a hash function. A data center receives resource allocation requests from applications, such as video services applications, including a computed hash value based on the desired resource and indicative of the service node for providing the requested resource. A remote resource management client identifies the resource and computes the hash based on a request from the application, and transmits the request to a resource management server on the service node having the resource indicated by the hash, thus avoiding centralized queuing or caching of the resource requests and instead delegating to the service nodes. Service nodes may redundantly share responsibility for the resources through a root node or a cluster arrangement, providing failover if a service node becomes inoperational.

19 Claims, 8 Drawing Sheets

DISTRIBUTED RESOURCE MANAGEMENT

RELATED APPLICATIONS

This application claims priority to and the benefit under 35 U.S.C. §119(e) of U.S. Provisional Patent Application No. 61/257,251, filed Nov. 2, 2009, entitled "DISTRIBUTED RESOURCE MANAGEMENT," the contents of which is hereby incorporated by reference in its entirety.

BACKGROUND

In a network services environment, users invoke clients for requesting services from a provider. Typically the provider operates through multiple servers, responsive to the clients, for providing the service. Provisioning the service, such as, for example video, audio, Internet connectivity, and so forth, often invokes resources that are shared among the user base for providing the service as needed. Such shared resource, such as channels for video and bandwidth ranges for multimedia transport, are often disposed at central locations in proximity to the users or a subset thereof, so that resource allocations may be made in a timely and effective manner to provide the desired service.

Allocation of resources, therefore, designates particular resources for usage on behalf of specific users in a manner that the resource is efficiently allocated without undue delay, and is returned to the common pool for use by another user when the service is complete, thus ensuring reasonable availability of shared resources for all users. For example, in a video services environment, a predetermined number of MPEG channels are available to a headend serving a regional set of users. A video on demand (VOD) application requests one of the channels in response to a user selection from a set-top box. A resource management mechanism allocated the channel to the user for the duration of a requested feature, then deallocates the channel so that it is available for other users. A multitude of resource requests emanating from a user base can cause undue delays if multiple resource requests become queued.

SUMMARY

A distributed resource management mechanism allocates transmission resources by distributing the resources among a plurality of service nodes each responsible for a portion of the resources according to a hash function. A data center receives resource allocation requests from applications, such as video services applications, including a computed hash value based on the desired resource and indicative of the service node for providing the requested resource. A resource manager allocates the resources and includes a plurality of remote clients responsive to the headend and corresponding servers at the data center. The remote resource management client identifies the resource and computes the hash based on a request from the application, and transmits the request to a counterpart resource management server on the service node having the resource indicated by the hash, thus avoiding centralized queuing or caching of the resource requests, and instead delegating to the service nodes (nodes). Requested resources may include pooled resources such as MPEG program numbers, and shared resources such as bandwidth allocations, in a video delivery services environment allocating resources to the video services applications. Service nodes may redundantly share responsibility for the resources through a root node or a cluster arrangement, providing failover if a service node becomes inoperational.

Configurations herein are based, in part, on the observation that conventional centralized resource management typically employs relational databases performing allocation transactions for the requested resources, thus invoking multiple servers and storage intensive I/O operations, often on high-end hardware having fast disk subsystems. Unfortunately, conventional arrangements for distributed resource management, particularly in a video services environment, suffer from the shortcomings of computationally intensive processing for handling a multitude of resource requests at a centralized location. Costly database licensees and corresponding hardware are a formidable obstacle, and also impose an upper scalability limit due to locking of database entities during resource request processing Accordingly, configurations herein substantially overcome the above described shortcomings through decentralization of the resources by apportioning, or subdividing, resource responsibility among different nodes and thus avoiding a bottleneck, or computationally intensive focal point, through which all requests must pass. Reliability is maintained by a redundancy scheme of multiple service nodes covering each hash-identified resource, and arranging the nodes in a clustered or root node arrangement to preserve atomicity.

In conventional arrangements, a relational database provides a mechanism called transactions to guarantee that a database operation will be performed successfully. This mechanism ensures that a given resource can only be allocated a single time and that pooled resources can be incremented and decremented in an atomic fashion. In contrast, configurations herein provide a clustered form of resource allocation data to improve scalability since multiple servers can be assigned to the cluster and multiple instances of a resource manager can be distributed across a set of servers without imposing a complex relational schema on resource allocation. Conventional clustered databases are costly due to both database licensing costs and large hardware costs. A relational database typically requires very high end hardware with fast disk subsystems. There is also a limit to the scalability since the transactional operations lock rows or tables in the database for relatively long periods of time.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitive computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Disclosed below are example configurations of a data center for performing resource allocation. Configurations depict a number of service nodes (nodes) having one or more resource management (RM) servers responsive to resource management (RM) clients at headends responsive to the set-top boxes disposed at subscriber locations. Evolving rendering devices may also include other forms of CPE (customer premises equipment) devices, such as a CableCARD equipped TV, PC client, mobile phones, and other suitable display devices. Various arrangements of the number of nodes, headends, service groups and set-top boxes may be envisioned; an example number of entities is presented for illustrating the claimed features.

A particular expectation of a resource management system is that a given resource cannot be over allocated. Thus, if multiple applications request the resource and the resource does not have enough available units to satisfy all of the requests, then some of the resource allocations fail. A resource manager is an application that is responsible for allocating and releasing resources. It is the responsibility of the resource manager to ensure a resource is not over allocated.

In one example of conventional approaches, a resource manager may use an in memory table for resource management. The resource manager is a multithreaded application, meaning that it handles multiple resource allocation requests simultaneously. The conventional sole resource manager locks the in memory table during resource allocation so that only one resource allocation request has access to resource data at any given time, thus preserving transaction atomicity. This prevents data corruption that may occur if multiple threads attempt to read, modify, and write the data at the same time. Data corruption can lead to over allocation of resources. A conventional in memory table can only be used by a single resource manager. Thus, a single resource manager keeps track of the resource allocations and all applications that require resources request the resources from that resource manager. Although resource allocation is fast since the resources are managed in memory, this mechanism has scalability limitations since only a single resource manager is handling all of the resource allocation requests. Conventional approaches encounter the shortcoming that a resource manager may represent a single point of failure.

Figure 1:
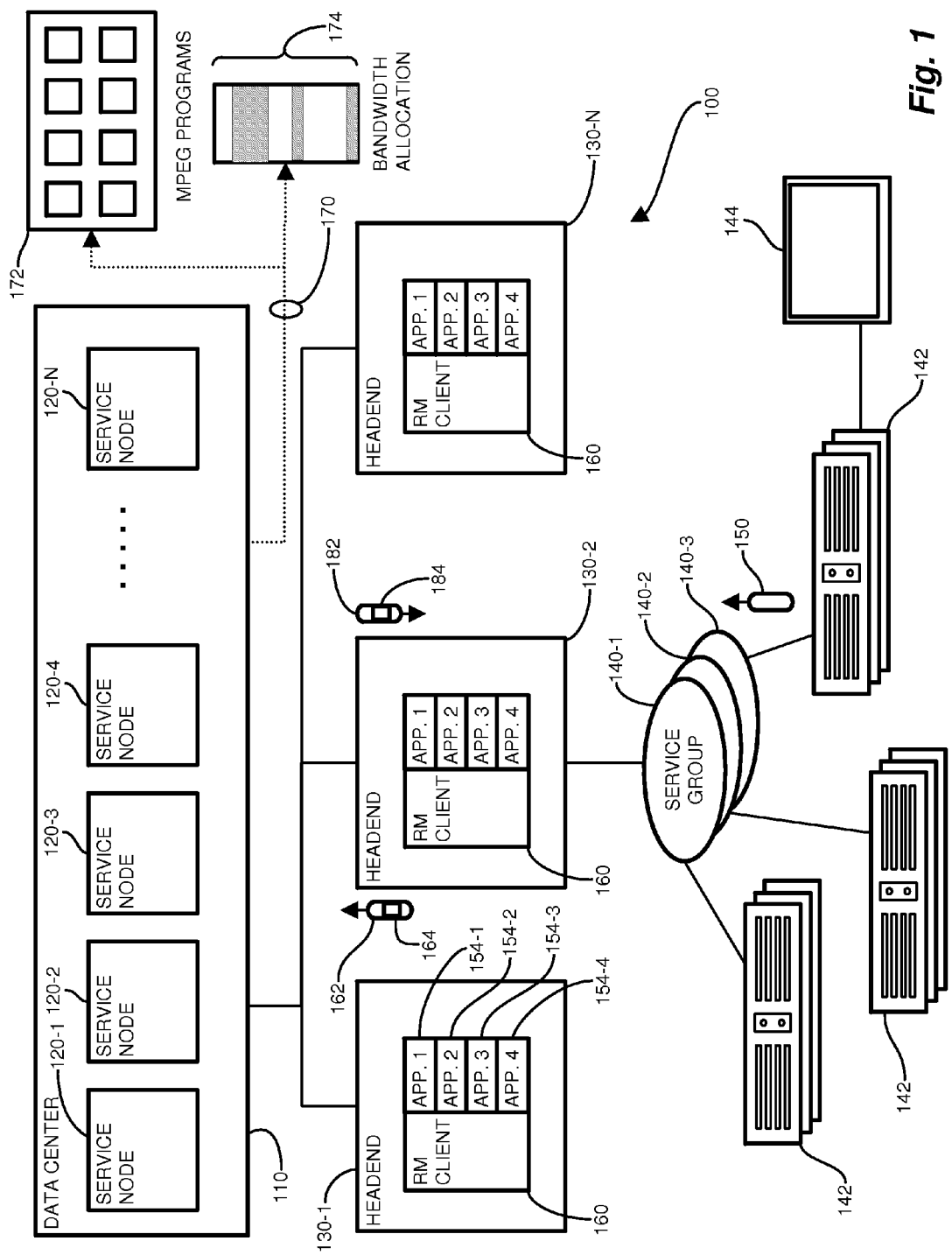
FIG. 1 is a context diagram of a video services environment suitable for use with configurations herein.

FIG. 1 is a context diagram of a video services environment suitable for use with configurations herein. Referring to FIG. 1, the video services environment 100 includes a data center 110 having a plurality of service nodes (nodes) 120-1 . . . 120-N (120 generally) for providing video services such as video on demand (VOD), switched digital video (SDV), streaming audio and video, and multicast (non selective) video such as basic cable TV service. Other multimedia services may be provided. Each of the service nodes 120 has or controls access to a set of resources 170 such as MPEG programs 172 and bandwidth allocations 174 for use in providing the video services. The data center 110 supports a number of head ends 130-1 . . . 130-N (130 generally), each having one or more service groups 140-1 . . . 140-3 (140 generally). Each service group 140 connects to set-top boxes 142 or similar rendering equipment disposed at a customer location (typically a home) for deployment of the video services on a video device 144 (typically an LCD, Plasma, LED or projection screen), also referred to as customer premises equipment (CPE). A user sends a selection 150 for video services, using the set top box 142 in conjunction with on-screen displays and a remote for selecting the various services, to the headend 130 corresponding to the user. Each headend includes applications 154-1 . . . 154-4 (154 generally) responsive to the user selection 150, and a resource management client 160 for generating a resource request 162.

The resource management client 160 determines the destination of the resource request 162 by computing a hash value 164 corresponding to the resource for delivering the selection 150. For example, a VOD selection may invoke an MPEG program number 172, and a streaming video selection may require a bandwidth range 174. The computed hash value 164 corresponds to, or maps to, a node 120 having the resource 170. Upon receiving the resource request 162, the node 120 indicated by the hash value 164 allocates the resource 170 and delivers the service 184 to the user video device 144 in one or more responses 182.

Figure 2:
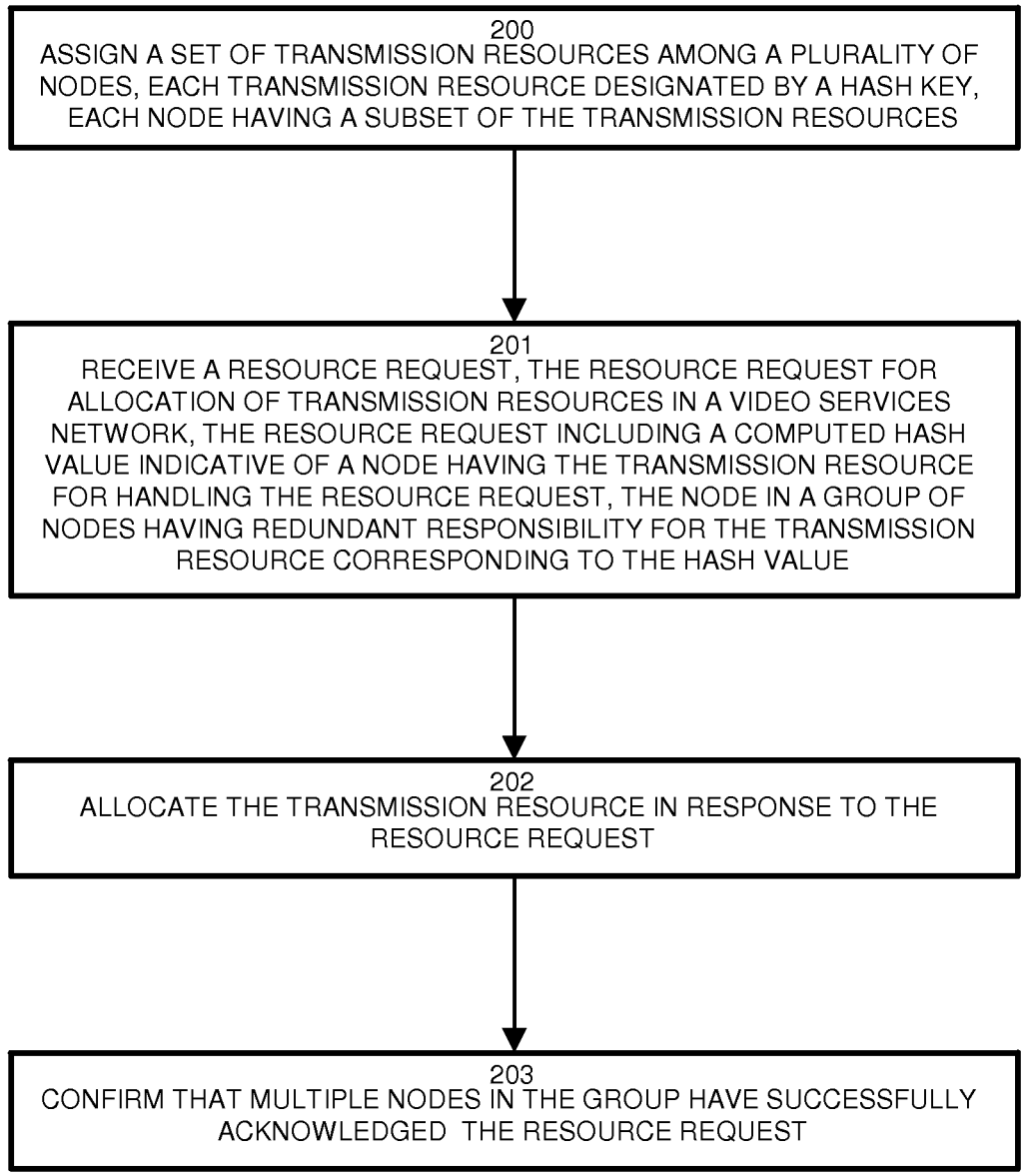
FIG. 2 is a flowchart of resource configuration in the environment of FIG. 1.

FIG. 2 is a flowchart of resource configuration in the environment of FIG. 1. Referring to FIGS. 1 and 2, the method of resource management as disclosed herein includes, at step 200, assigning a set of transmission resources among a plurality of nodes 120, in which each transmission resource 170 is designated by a hash key 192 (FIG. 3) and each node 120 has control of and/or access to a subset of the transmission resources 170. The node 120 receives a resource request 162, in which the resource request 162 is for allocation of transmission resources 170 (including MPEG programs 172, bandwidth 174, and other suitable resources) in a video services network 100. The resource request 162 includes a computed hash value 164 indicative of a node 120 having the transmission resource 170 for handling the resource request 162, in which the node 120 is in a group of nodes 120-1-1 . . . 120-1-3 (such as a cluster or root arrangement, discussed further below) having redundant responsibility for the transmission resource 170, the node corresponding to the hash value 164, as depicted at step 201. In response to the request 162, a resource management server 180 (FIG. 3) allocates the transmission resource 170 in response to the resource request 162 by sending the response 182 including the requested service 184, as shown at step 202. The service 184, which may be for example a VOD feature, may take the form of a sequence of responses 182 as a stream or packet set. The resource management server 180 then confirms that multiple nodes 120-1-1 . . . 120-1-N (FIG. 3) in the group have successfully acknowledged the resource request 162, as disclosed at step 203, thus allowing for a group or cluster of nodes to share redundant responsibility for allocation and deallocation resources for providing failover support and avoiding "hung" resources which are never deallocated.

Figure 3:
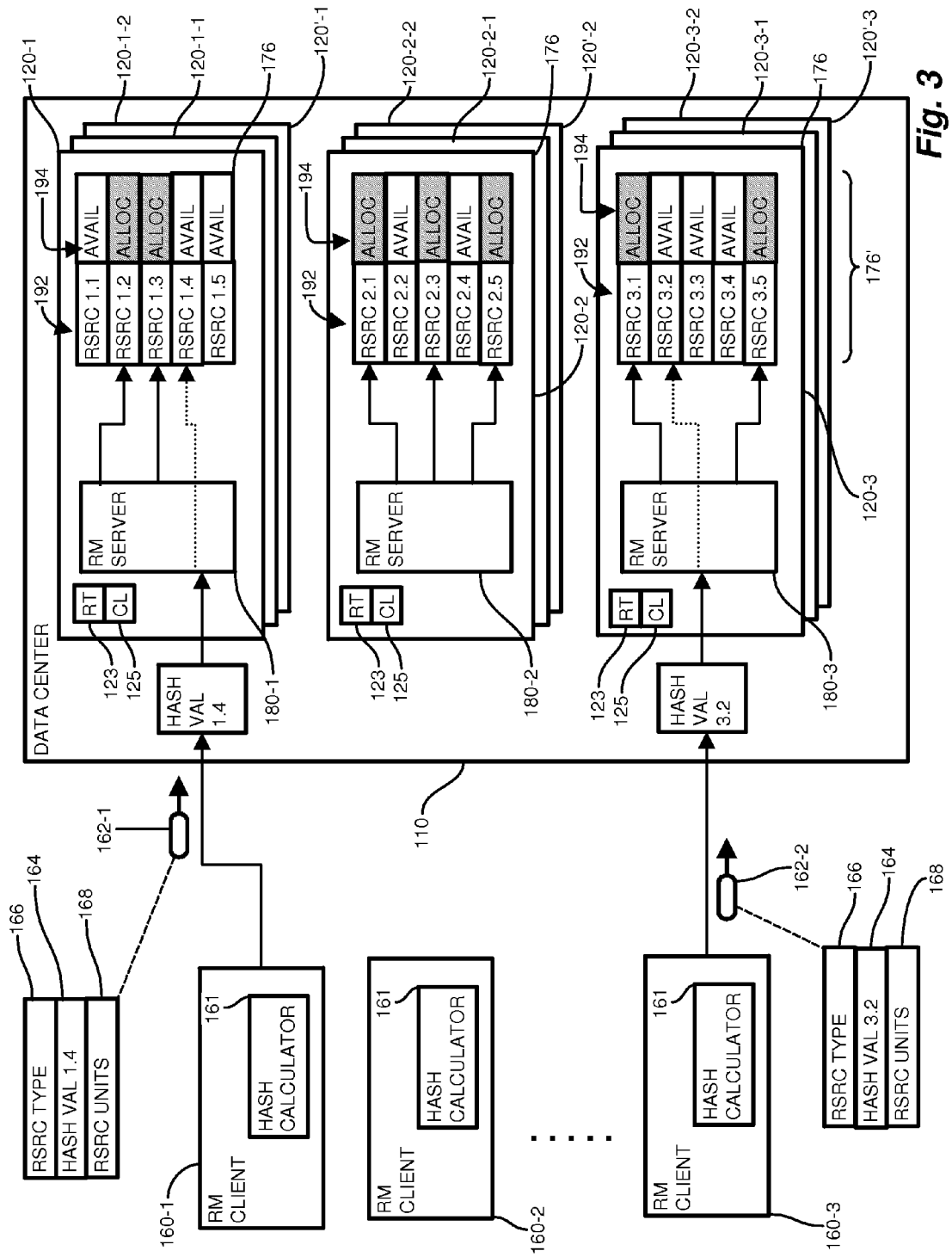
FIG. 3 shows an arrangement of nodes in the environment of FIG. 1.
Figure 4:
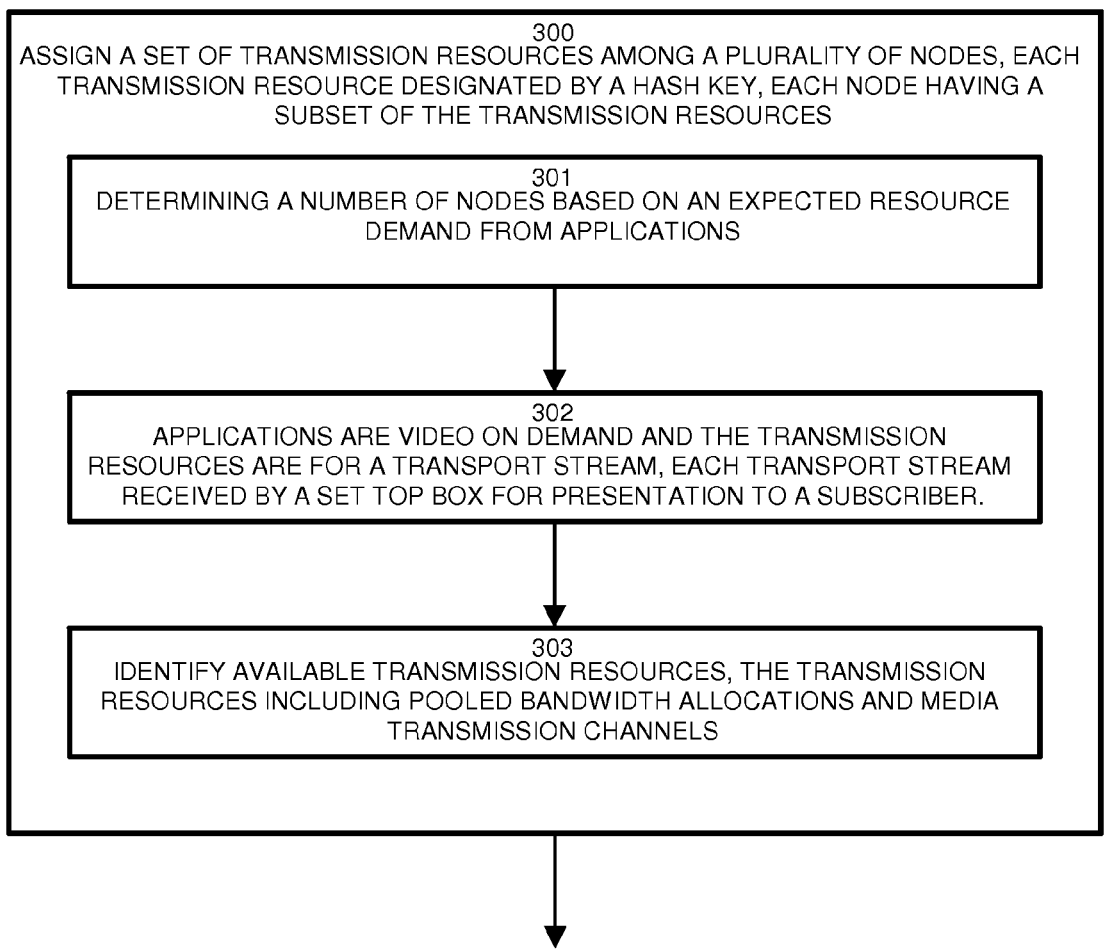
FIGS. 4-8 are a flowchart of resource allocation employing the nodes in FIG. 3.
Figure 5:
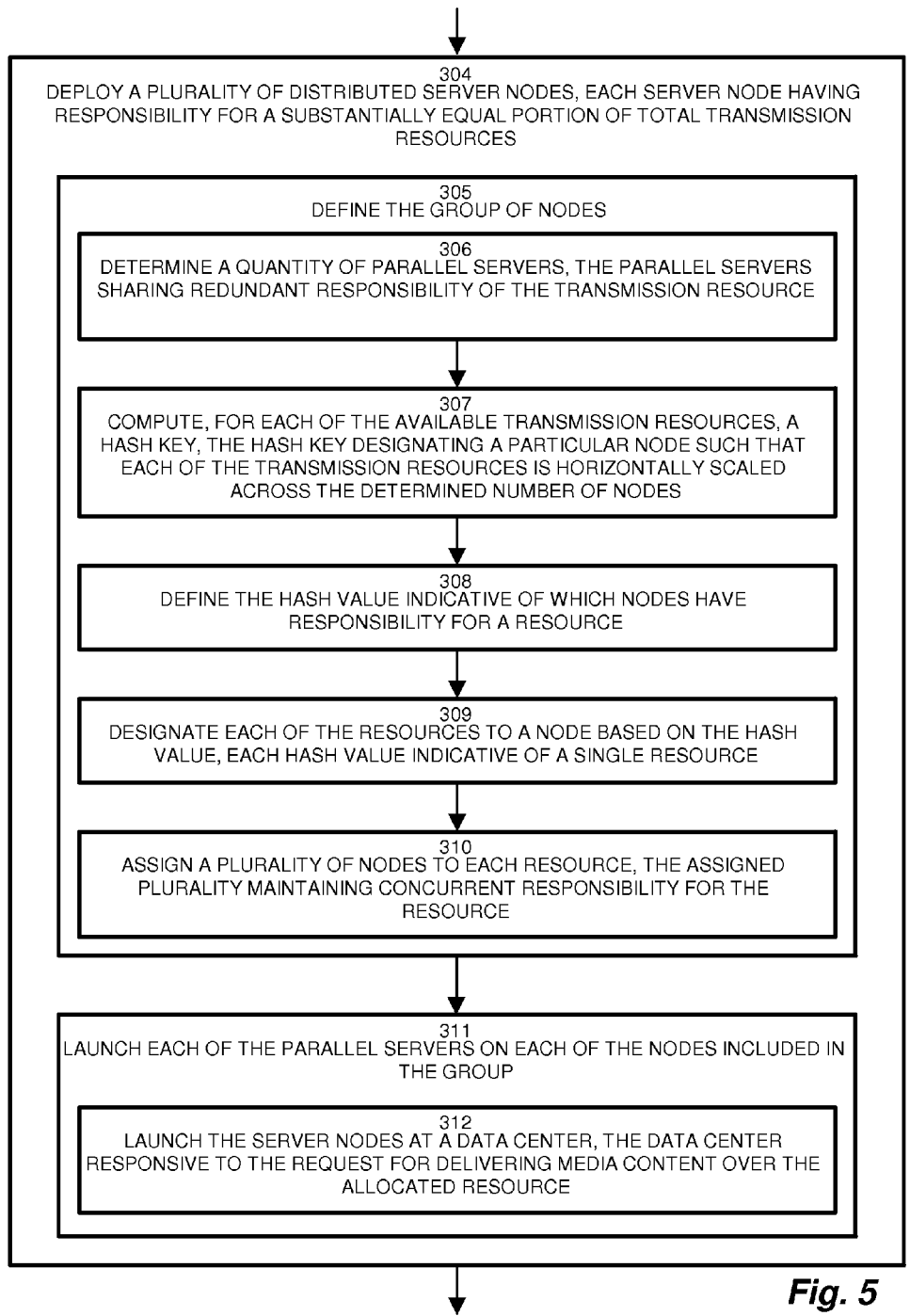
Figure 6:
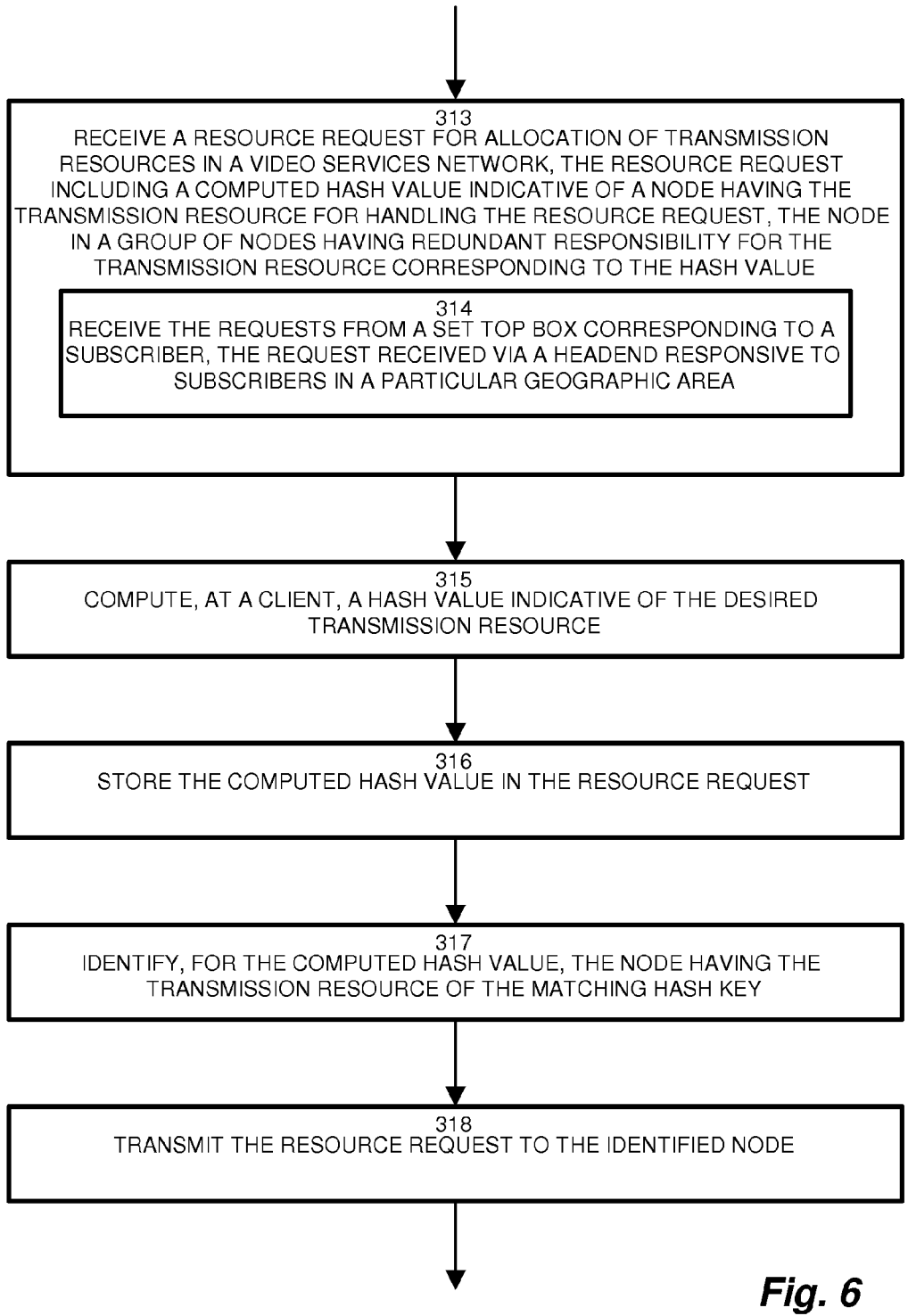
Figure 7:
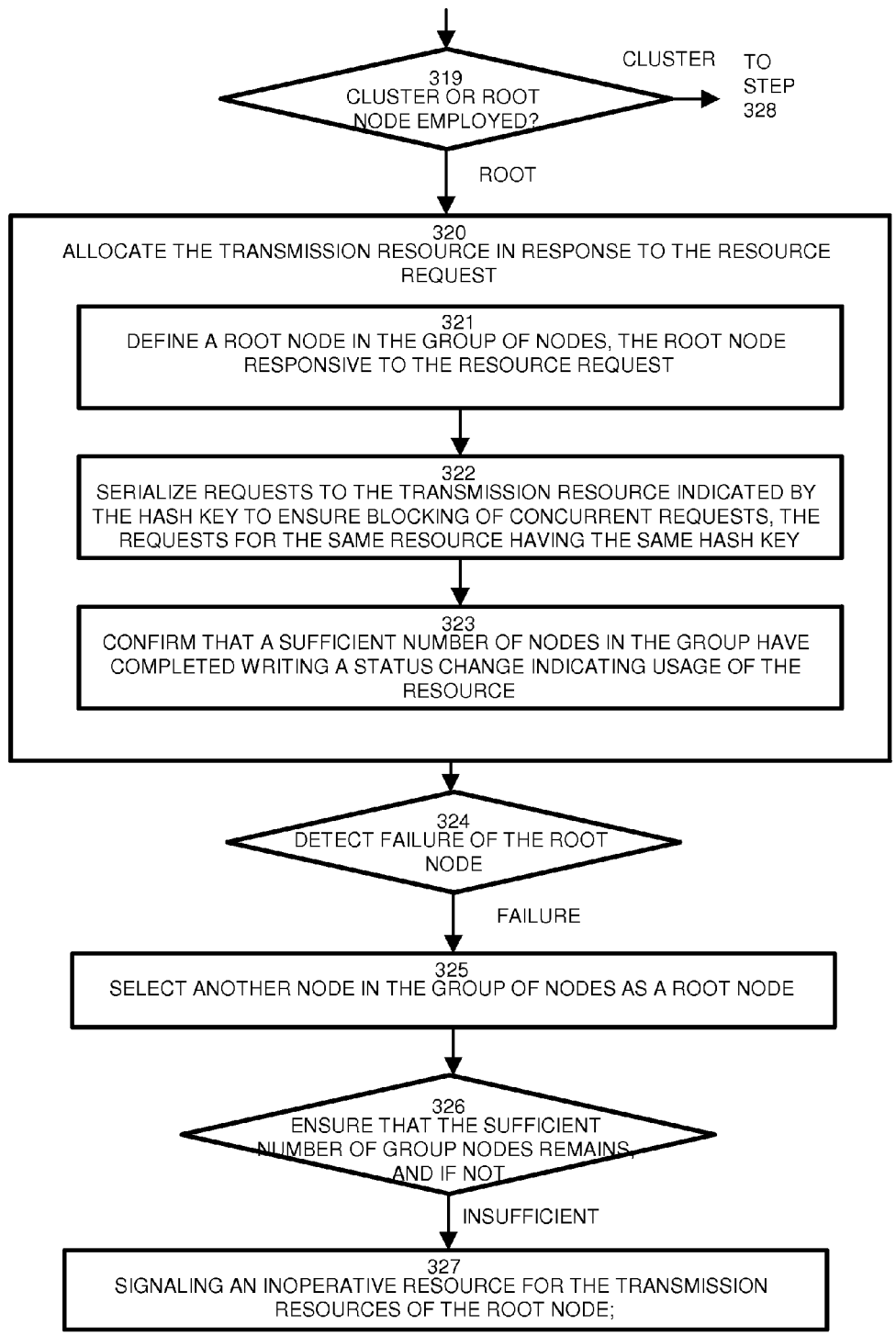
Figure 8:
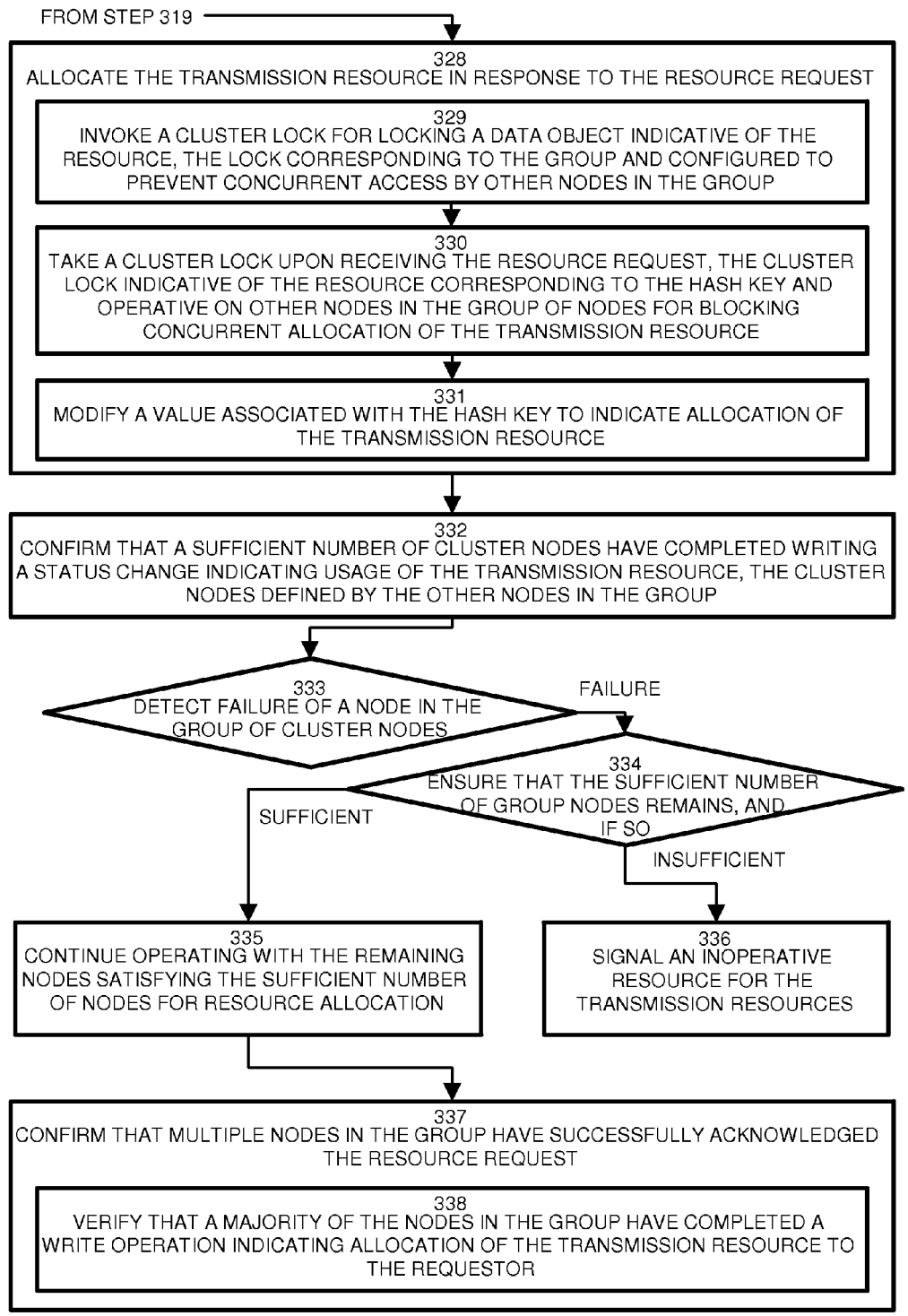

FIG. 3 shows an arrangement of nodes 120 (service nodes) in the environment of FIG. 1. Referring to FIGS. 1 and 3, each remote client 160-1 . . . 160-N (160 generally) has a hash calculator 161 for computing or retrieving the hash value 164 corresponding to a requested resource 170. Upon receiving the service request 150, the remote client generates the resource request 162-1, 162-2 (162 generally) including a resource type (MPEG program 172, bandwidth 174, or other suitable resource) and resource units corresponding to the request, such as bandwidth amount, frequency subrange, or number of MPEG programs requested. Since the hash value 164 is determined at the client 160 and is deterministic of the node 120 having the resource 170, bottlenecks or centralized queuing of all requests 162 from each client 160 is avoided. The service nodes 120 may further be arranged in redundancy groups 120'-1, including nodes 120-1-1 . . . 120-1-N for clustering or root node resiliency, discussed further below. The resource management server 180-1 . . . 180-3 (180 generally) corresponding to the hash value 164 identifies the actual resource via a key 192 or index lookup of a resource allocation table 176, and retrieves an associated status field 194 indicative of availability of the resource 170 denoted by the hash value 164. Collectively, therefore, the resource allocation tables 176 define a distributed hash table 176' (DHT). Upon receiving the request 162, if the status 194 is AVAIL, the node 120 allocates the resource. If the status 194 is allocated (ALLOC), the requests 162 may be queued or deferred, but need not be funneled through a set of requests other than requests 162 directed to the node 120 other than that having the resource 170 designated by the hash value 164. Upon availability and assignment of the resource, the server 180 updates the status 194 in the resource allocation table 176 to ALLOC, and returns an indication of the allocated resources in a resource allocation 180 to the headend 130 for use by the requesting set top box 142.

FIGS. 4-8 are a flowchart of resource allocation employing the nodes in FIG. 3. Referring to FIGS. 3-8, a hashing arrangement is employed for assigning a set of transmission resources 170 among a plurality of nodes 120, such that each transmission resource 170 is designated by a hash key 192 in which each node 120 has a subset of the transmission resources 170, as shown at step 300. The hashing mechanism computes a value such that the resource 170 responsibility is distributed in a substantially equal manner among the available nodes 120, and for allowing computation of the hash to indicate the responsible node 120 for directing the request 162 to that node 120.

The distributed hash table (DHT) 176', collectively including allocation tables 176-N, provides a highly scalable method for storing data. A DHT 176' stores data using as a key-value pair such as the hash key 192 and status 194. A DHT consists of multiple nodes. Each node stores a group of keys 192 and their associated values 194. The DHT nodes are distributed across a set of servers 180. Thus, data stored in the hash table 176 is distributed across the DHT nodes 120, which proves to be highly scalable. For redundancy, data in the DHT is stored multiple times on different nodes 120'. One node is assigned as the root node 120-1 for a given key. This can be determined by taking a hash of the key and then evenly distributing hash values across the nodes. Nodes 120 are considered to be connected in a ring, with neighbors of any given node handling adjacent hash ranges, however other suitable distribution may be employed.

When data is written to the DHT 176', it is written to the root node 120-1 for that particular key and a set of neighboring nodes 120'-1-N. The DHT 176' expects that a majority of write operations succeed. Thus, if a node 120 in the DHT fails, the original data can be recovered from the neighboring nodes. A DHT read operation uses the key to determine the root DHT node. The read operation reads from the root node and the set of neighboring nodes. A majority of the read operations should succeed (based on a selected threshold/majority) so that the reader has confidence in the data read from the DHT 176'. The DHT may require 4 out of the 5 writes to succeed, meaning 4 of 5 DHT nodes have the correct data. During the read operation, even if a different node fails, the read operation can receive the correct data from 3 of the 5 nodes.

Assigning the transmission resources based on a hash or other suitable distribution further includes determining a number of nodes 120 based on an expected resource demand from applications 154, as depicted at step 301. Example applications 154 include video on demand such that the transmission resources 170 are for a transport stream, in which each transport stream may be received by a set top box for presentation to a subscriber, as depicted at step 302. This includes identifying available transmission resources 170, in which the transmission resources include pooled bandwidth allocations 174 and media transmission channels 172, as depicted at step 303.

The data center 110 deploys a plurality of distributed server nodes 120, such that each server node 120 has responsibility for a substantially equal portion of total transmission resources 170 as determined by the hash, as disclosed at step 304. The centrally located data center 110 (or other suitable node arrangement) define the group of nodes, as depicted at step 305, by determining a quantity of parallel servers 180, in which the parallel servers share redundant responsibility of the transmission resources 170, as shown at step 306, and computing, for each of the available transmission resources 170, a hash key 192, in which the hash key designates a particular node 120 such that each of the transmission resources 170 is horizontally scaled across the determined number of nodes 120, as depicted at step 307. The selected hash function or operation defines the hash key 192 indicative of which nodes 120 have responsibility for a resource 170, such as MPEG programs 172 and bandwidth 174, as well as other resources, as depicted at step 308. Based on the hash 192, the data center 110 designates each of the resources 170 to a node 120 based on the hash 192, such that each hash value is indicative of a single resource 170, as disclosed at step 309.

In order to maximize scalability, the resource managers 160, 180 and data 176 are distributed across a set of servers. Since the DHT already distributes data across nodes (and thus servers), a mechanism needs to be designed to allow a resource manager to be distributed yet ensure resource data is not corrupted when multiple application require access to the same set of resources. Configurations herein provide a solution to by placing each resource manager on the DHT node 120 itself. Thus, there will be one instance of the resource manager on each DHT node. Now the data and resource managers are distributed and scalable. If the DHT or resource managers do not have enough processing power to support resource allocation requirements, more DHT nodes can be added to increase the performance of the DHT and resource managers.

To solve the data corruption problem due to lack of record lock or transaction capability, as discussed above, the read and write sequence to the DHT needs to change from conventional approaches. Originally, requests for resources are load balanced to available resource managers. This may lead to data conflicts since multiple resource managers may read, modify, and write the same resource at the same time. Resources are naturally distributed across DHT nodes since the resource key is hashed and placed on a root node and neighbor nodes based on the hash. If the desired resource is known when allocating the resource, the resource key can be hashed and the resource request can be directed to the root DHT node for that hash. The resource manager on the DHT node will serialize requests for a given resource. Thus, all requests for the same resource go to the same resource manager 180, which ensures that the read, modify, and write sequence for resource allocations are sequential, thus data in the tables 176 will not be corrupted. Upon resource allocation on the root node 120-1, the root node distributes the updated resource assignments 194 to the appropriate neighbor nodes 120-1-N in the group.

The data center 110 assigns a plurality of nodes to each resource 170 as a root or cluster group 120-1-N, such that the assigned plurality maintains concurrent responsibility for the resource 170, as shown at step 310. The data center 110 launches each of the parallel servers 180 on each of the nodes 120 included in the group 120'-1, as depicted at step 311, which includes launching the server nodes 120 at the data center 110, in which the data center 110 is responsive to the request 162 for delivering media content (i.e. services) over the allocated resource 170, as shown at step 312.

Following launch of the resource management servers 180 on the nodes 120, the data center 110 receives a resource request 162, for allocation of transmission resources in a video services network, in which the resource request 162 includes the computed hash value 164 indicative of a node 120 having the transmission resource for handling the resource request 162, and in which the node 120-N is in a group 120'-N of nodes having redundant responsibility for the transmission resource 170 corresponding to the hash value 164, as depicted at step 313. The group 120'-N may be a dedicated group of nodes 120 each having concurrent responsibility for the same set of hashed resources, or individual nodes 120 may concurrently address groups in an overlapping manner, possibly having multiple resource management servers 180 on a node 120. In either case, each node 120 belongs to a group 120'-N of nodes 120'-N-1 . . . 120'-N-M redundantly configured for accessing a resource 170 in a root or cluster arrangement, with the group 120' defined by the hash value 164 and adjacent nodes or other mechanism, such as interleaving or partitioning. An odd number of nodes in a group (i.e. 3 or 5) further facilitates a majority determination.

When a given application 154 requests a resource 170, the resource manager client 160 determines the shared resource or resource pool to use and calculates the hash 164 of the resource key 194. The resource manager client 160 determines the root DHT node (or cluster node, discussed further below) for that hash, likely by querying the DHT. The resource manager client 160 sends a resource allocation request 162 to the resource manager server 180 on the Root DHT Node. The resource manager server serializes requests for allocation requests based on the resource key 192.

The resource requests 162 result from receiving service requests 150 for video or other services from a set top box 142 corresponding to a subscriber, in which the request 150 is received via a headend 130 responsive to subscribers in a particular geographic area, as depicted at step 314. The headend 130 computes, at a resource management client 160, a hash value 164 indicative of the desired transmission resource 170, as disclosed at step 315. The headend 130 stores the computed hash value 164 in the resource request 162, as depicted at step 316, and identifies, for the computed hash value 164, the node 120 having the transmission resource 170 of the matching hash key, as shown at step 317. The headend 130 then transmits the resource request 162 to the identified node 120, as depicted at step 318.

A check is performed, at step 319, depending upon whether root node 120-1 or cluster node 120'-1 allocation is employed. If a root node is employed, then the corresponding node group 120'-N allocates the transmission resource 170 in response to the resource request 162, as defined at step 320, including defining or identifying a root node 120 using a root indicator 123 in the group of nodes 120'-N responsive to the resource request, as shown at step 321. The root node 120 serializes the requests 162 to the transmission resource 170 indicated by the hash key 192 to ensure blocking of concurrent requests when the requests 162 are for the same resource 170 have the same hash key 192, as disclosed at step 322. Upon purported allocation by the node group 120'-N, the root node confirms that a sufficient number of nodes 120 in the group 120'-N have completed writing a status change indicating usage of the resource 170, as depicted at step 323.

A further check at step 324 detects failure of the root node 120-1, and selects another node 120-1-N in the group 120'-N of nodes as a root node 120-1, as disclosed at step 325. The newly selected root node 120-1 then ensures that the sufficient number of group nodes 120 remains (such as a majority), as shown at step 326 and if not, signals an inoperative resource for the transmission resources 170 of the root node (i.e. the resources overseen by the group 120'-N), as depicted at step 327.

If a cluster group 120'-N is employed, the cluster nodes 120' allocate the transmission resource 170 in response to the resource request 162, as shown at step 328. Allocating includes invoking a cluster lock 125 for locking a data object indicative of the resource, the lock corresponding to the group 120' and configured to prevent concurrent access by other nodes in the group, as shown at step 329. The node 120 invokes the cluster lock 125 upon receiving the resource request 162, in which the cluster lock is indicative of the resource 170 corresponding to the hash key 192 and operative on other nodes 120 in the group of nodes 120' for blocking concurrent allocation of the transmission resource 170, as shown at step 330.

A cluster lock 125 is a lock established on an individual resource that is shared across all of the nodes that manage that resource. When a given node establishes a lock on a cluster lock, the other nodes 120 must wait until the lock is released to establish their own lock. Note that each resource has its own cluster lock. Using a single cluster lock for all resources may otherwise trigger a bottleneck. Use of the cluster lock 125 prevents multiple resource managers 180 from operating on the same resource simultaneously. However, many of the distributed resource management concepts still apply when using cluster locks. For example, resources are distributed across the DHT nodes for scalability purposes. Copies of a given resource are stored on multiple nodes (i.e. cluster group 120') for redundancy purposes.

A particular benefit of using the cluster lock 125 is that the DHT 176' does not maintain a specific root node for a given resource. Any of the nodes 120 using that resource may act as a root node at any given time by acquiring the cluster lock. If one node 120 with the data fails, the other nodes 120' can continue operating on the data without needing to determine a new root node. Acquiring the cluster lock 125, however, may take additional time, and thus performance may be affected.

The cluster 120' modifies a value 194 associated with the hash key 192 to indicate allocation of the transmission resource 170, as shown at step 331. The nodes 120 confirm that a sufficient number of cluster nodes 120' have completed writing a status change 194 indicating usage of the transmission resource 170, such that the cluster nodes 120-N-M are defined by the other nodes in the group 120'-N, as disclosed at step 332. If a failure of a node 120 in the group 120' of cluster nodes is detected, at step 333, the remaining nodes 120 ensure that the sufficient number of group nodes remains, as depicted at step 334, and if so continue operating with the remaining nodes 120' satisfying the sufficient number of nodes 120 for resource allocation, as disclosed at step 335 and if not, signaling an inoperative resource for the transmission resources 170, as shown at step 336, such as by marking the status 194 as unavailable or allocated. In the positive flow, the group 120' nodes confirm that multiple nodes 120 in the group 120' have successfully acknowledged the resource request 162, as depicted at step 337, which includes acknowledging the resource request by verifying that a majority of the nodes 120 in the group 120' have completed a write operation indicating allocation of the transmission resource 170 to the requestor 142, as disclosed at step 338.

Those skilled in the art should readily appreciate that the programs and methods for distributed resource management as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method of distributed resource management has been particularly shown and described with references to embodiments thereof, it will be understood by those skilled in the art that various changes in form and details may be made therein without departing from the scope of the invention encompassed by the appended claims.

What is claimed is:

1. A method of resource management comprising:
   assigning a set of transmission resources among a plurality of nodes, each transmission resource designated by a hash key, each node having a subset of the transmission resources;
   receiving a resource request for allocation of transmission resources in a video services network, the resource request including a computed hash value indicative of a node having the transmission resource for handling the resource request, the node in a group of nodes having redundant responsibility for the transmission resource corresponding to the hash value, wherein a collection of resource allocation tables from each node in the group of nodes defines a distributed hash table;
   allocating the transmission resource in response to the resource request, wherein allocating the transmission resource includes the node invoking a cluster lock for locking a data object indicative of the transmission resource corresponding to the hash value, the cluster lock corresponding to the group of nodes and configured to prevent concurrent access by other nodes in the group of nodes, and wherein each transmission resource has its own cluster lock; and
   confirming that multiple nodes in the group have successfully acknowledged the resource request.

2. The method of claim 1 further comprising:
   computing, at a client, a hash value indicative of the desired transmission resource;
   storing the computed hash value in the resource request;
   identifying, for the computed hash value, the node having the transmission resource of the matching hash key; and
   transmitting the resource request to the identified node.

3. The method of claim 2 wherein acknowledging the resource request includes verifying that a majority of the nodes in the group have completed a write operation indicating allocation of the transmission resource to the requestor.

4. The method of claim 1 further comprising defining the group of nodes by:
   determining a quantity of servers for parallel execution, the parallel servers sharing redundant responsibility of the transmission resource; and
   launching each of the parallel servers on each of the nodes included in the group.

5. The method of claim 4 further comprising defining a root node in the group of nodes, the root node responsive to the resource request for:
   serializing requests to the transmission resource indicated by the hash key to ensure blocking of concurrent requests, the requests for the same resource having the same hash key; and
   confirming that a sufficient number of nodes in the group have completed writing a status change indicating usage of the resource.

6. The method of claim 5 further comprising
   detecting failure of the root node;
   selecting another node in the group of nodes as a root node;
   ensuring that the sufficient number of group nodes remains, and if not;
   signaling an inoperative resource for the transmission resources of the root node.

7. The method of claim 4 further comprising:
   modifying a value associated with the hash key to indicate allocation of the transmission resource; and
   confirming that a sufficient number of cluster nodes have completed writing a status change indicating usage of the transmission resource, the cluster nodes defined by the other nodes in the group.

8. The method of claim 7 further comprising:
   detecting failure of a node in the group of cluster nodes;
   ensuring that the sufficient number of group nodes remains, and if so,
   continuing operating with the remaining nodes satisfying the sufficient number of nodes for resource allocation; and if not
   signaling an inoperative resource for the transmission resources.

9. The method of claim 1 wherein assigning the transmission resources further comprises:
   determining a number of nodes based on an expected resource demand from applications;
   identifying available transmission resources, the transmission resources including pooled bandwidth allocations and media transmission channels;

computing, for each of the available transmission resources, a hash key, the hash key designating a particular node such that each of the transmission resources is horizontally scaled across the determined number of nodes.

10. The method of claim 9 further comprising:
deploying a plurality of distributed server nodes, each server node having responsibility for a substantially equal portion of total transmission resources;
launching the server nodes at a data center, the data center responsive to the request for delivering media content over the allocated resource; and
receiving the requests from a set top box corresponding to a subscriber, the request received via a headend responsive to subscribers in a particular geographic area.

11. The method of claim 1 further comprising:
defining the hash value indicative of which nodes have responsibility for a resource;
designating each of the resources to a node based on the hash value, each hash value indicative of a single resource; and
assigning a plurality of nodes to each resource, the assigned plurality maintaining concurrent responsibility for the resource.

12. The method of claim 9 wherein the applications include at least one of video on demand or switched digital video and the transmission resources are for a transport stream, each transport stream received by a video rendering device for presentation to a subscriber.

13. The method of claim 1 wherein the other nodes in the group must wait until the lock is released to establish their own lock.

14. A data center for resource management servers comprising:
a data center having a plurality of nodes and an interface to resource management clients responsive to set top boxes of subscribers,
a set of transmission resources assigned among the plurality of nodes, each transmission resource designated by a hash key, each node having a subset of the transmission resources, wherein a collection of resource allocation tables from each node in the plurality of nodes defines a distributed hash table;
an interface to a headend for receiving a resource request, the resource request for allocation of transmission resources in a video services network, the resource request including a computed hash value indicative of a node having the transmission resource for handling the resource request, the node in a group of nodes having redundant responsibility for the transmission resource corresponding to the hash value;
a cluster lock responsive to allocation of a resource by locking a data object indicative of the transmission resource, the cluster lock corresponding to the group of nodes and configured to prevent concurrent access by other nodes in the group of nodes, wherein each transmission resource has its own cluster lock
a resource allocation table designating allocation of the transmission resource in response to the resource request; and
a status indicator in the resource allocation table for confirming that multiple nodes in the group have successfully acknowledged the resource request.

15. The data center of claim 14 further comprising:
a hash calculator for computing, at a client, a hash value indicative of the desired transmission resource; the interface to the headend configured to:
store the computed hash value in the resource request and identifying, for the computed hash value, the node having the transmission resource of the matching hash key; and
transmit the resource request to the identified node.

16. The data center of claim 15 wherein the status indicator is responsive to verification that a majority of the nodes in the group have completed a write operation indicating allocation of the transmission resource to the requestor, further comprising:
a predetermined number of nodes defining the group of nodes from a specified quantity of parallel servers,
the parallel servers sharing redundant responsibility of the transmission resource,
each of the parallel servers configured to be launched on each of the nodes included in the group.

17. The data center of claim 14 wherein the data center is for assigning the transmission resources and configured to:
determine a number of nodes based on an expected resource demand from applications;
identify available transmission resources, the transmission resources including pooled bandwidth allocations and media transmission channels; and
compute, for each of the available transmission resources, a hash key, the hash key designating a particular node such that each of the transmission resources is horizontally scaled across the determined number of nodes.

18. The data center of claim 17 wherein the data center is further configured to:
deploy a plurality of distributed servers on the nodes, each node having responsibility for a substantially equal portion of total transmission resources;
launch the servers on respective nodes defined by the hash, the data center responsive to the request for delivering media content over the allocated resource; and
receive the requests from a set top box corresponding to a subscriber, the request received via a headend responsive to subscribers in a particular geographic area.

19. A computer program product having an encoded set of processor based instructions on a non-transitive computer readable storage medium for performing a method of connecting a network switching device between a transport network and an access network, the access network for providing connectivity between the transport network and end stations coupled to the access network, the method comprising method of resource management comprising:
assigning a set of transmission resources among a plurality of nodes, each transmission resource designated by a hash key, each node having a subset of the transmission resources, wherein a collection of resource allocation tables from each node in the plurality of nodes defines a distributed hash table;
receiving a resource request, the resource request for allocation of transmission resources in a video services network, the resource request including a computed hash value indicative of a node having the transmission resource for handling the resource request, the node in a group of nodes having redundant responsibility for the transmission resource corresponding to the hash value;
allocating the transmission resource in response to the resource request, wherein allocating the transmission resource includes the node invoking a cluster lock for locking a data object indicative of the transmission resource corresponding to the hash value, the cluster lock corresponding to the group of nodes and configured to prevent concurrent access by other nodes in the group of nodes, and wherein each transmission resource has its own cluster lock;

confirming that multiple nodes in the group have successfully acknowledged the resource request.

* * * * *